United States Patent
Prakash et al.

(10) Patent No.: US 6,584,213 B2
(45) Date of Patent: Jun. 24, 2003

(54) MOTION MATCHING METHOD

(75) Inventors: Adityo Prakash, Redwood Shores, CA (US); Eniko Fodor, Redwood Shores, CA (US); Edward Ratner, Sunnyvale, CA (US)

(73) Assignee: Pulsent Corporation, Fremont, CA (US)

( * ) Notice: Subject to any disclaimer, the term of this patent is extended or adjusted under 35 U.S.C. 154(b) by 0 days.

(21) Appl. No.: 09/912,743

(22) Filed: Jul. 23, 2001

(65) Prior Publication Data

US 2003/0031346 A1 Feb. 13, 2003

(51) Int. Cl.$^7$ ................................................ G06K 9/00
(52) U.S. Cl. ..................... 382/107; 382/209; 382/280
(58) Field of Search ............................. 382/106, 107, 382/190, 209, 236, 239, 280, 281, 282; 345/603; 375/240

(56) References Cited

U.S. PATENT DOCUMENTS

| 4,817,176 | A | * | 3/1989 | Marshall et al. ............ 382/280 |
| 4,843,631 | A | * | 6/1989 | Steinpichler et al. ....... 382/280 |
| 5,654,762 | A |   | 8/1997 | Slavin et al. |
| 5,699,121 | A | * | 12/1997 | Zakhor et al. .............. 375/240 |
| 6,118,475 | A |   | 9/2000 | Iijima et al. |

\* cited by examiner

*Primary Examiner*—Bhavesh M. Mehta
*Assistant Examiner*—Abolfazl Tabatabai
(74) *Attorney, Agent, or Firm*—Philip H. Albert; Townsend and Townsend and Crew LLP

(57) ABSTRACT

An efficient method of matching a segment in one image with a segment in another image. Fourier transforms are implemented to aid in the process. In one embodiment, a method involves identifying a displacement of a segment present in a first image and a second image, the displacement representing a relative change in position of the segment between the first and second images.

14 Claims, 13 Drawing Sheets

MOTION MATCHING METHOD

CROSS-REFERENCES TO RELATED APPLICATIONS

The present application is related to (U.S. patent application Ser. No. 09/591,438, filed Jun. 9, 2000 and entitled "Method and Apparatus for Digital Image Segmentation") (hereinafter referred to as "Prakash II"), the disclosure of which is incorporated herein by reference for all purposes. The present application is related to (U.S. patent application Ser. No. 09/550,705, filed Apr. 17, 2000 and entitled "Method and Apparatus for Efficient Video Processing" (hereinafter referred to as "Prakash I"), the disclosure of which is incorporated herein by reference for all purposes.

BACKGROUND OF THE INVENTION

The present invention generally relates to digital signal pattern matching and more specifically some embodiments of the invention relate to methods and apparatus for matching segments across multiple related images.

Digital signal pattern matching involves a plurality of multi-dimensional digital signals and is a process of matching all or part of one or more of the signals to all or part of another one or more of the signals. For example, where the digital signals represent digitized images and the plurality relates to a sequence of digital images, a digital signal matching process might be used to identify corresponding portions of the images between two images that have a known relationship. One such relationship is where the digital images in the plurality form a timed sequence such as a video sequence and the two images that are being processed are two adjacent in time images.

Matching is often used to detect motion in the video sequence, by identifying an object in the scene captured in one digital image, identifying that same object in another scene and noting the position change from one image to the other. For example, where the video sequence being processed is a football game, the process might be used to detect the motion of an object such as a football. It should be noted that the matching processes described herein are not limited to actual objects in the scene, but might reference portions of objects. For example, in a video sequence of a beach ball having several solid colored portions of differing colors might be processed with each different colored portion being treated as a different object.

An image frame can be divided up into a plurality of segments such that each pixel is associated with exactly one segment, or in some cases with a small number of segments where a pixel is judged to be on a border of the image where a small number of segments meet. Typically, a segment is a portion of a digital signal wherein the pixel color values are substantially uniform. Several methods of dividing an image frame into segments according to the pixel color values of the image frame are described in Prakash II. As used herein, a segment is a portion of the image frame or frames that is a contiguous region having a relatively small amount of color variation throughout. For example, one image frame might include a region where the color values of the pixels in that region are all blue or variations of blue such that the region can be identified as a segment.

In the general case of motion matching, a segment of one image is identified from one digital signal representing an image frame and matched to a corresponding segment or portion of another image represented by another digital signal. The matching process, in this example, might consider the blue region (mentioned above) a segment and seek to match that segment with a similar blue region in another image frame.

While it need not be the case, matching is often an attempt to "track" a segment in a video sequence as it moves within the frame window of the video sequence. Thus, digital signal pattern matching can be used in various applications such as video compression, medical imaging and object tracking. For example, a digital image processor can determine how a segment moved from one image frame of a video sequence to the next image frame of the video sequence by noting the position of a segment in a first image frame, extracting that segment and matching it against a second image frame, noting the position of a corresponding (matched) segment found in the second image frame and using the difference between the positions as an indication of motion. Often, the motion between two frames of an N-dimensional sequence is described as an N-dimensional vector. Thus, where the video sequence is a sequence of two-dimensional images, the motion of a segment S can be expressed by the two-dimensional vector $u_S=(x_S, y_S)$, where $x_S$ is the relative displacement of the segment in the horizontal direction and $y_S$ is the relative displacement of the segment in the vertical direction. Typically, the units of measurement for the displacements are in pixels.

One known method for digital signal pattern matching is the exhaustive search method. This computationally expensive method involves comparing a segment from a first frame against the pixels of a second image frame at each possible location of the corresponding segment in the second image frame, within a limited search area. This method is computationally expensive because the pixel color values (usually organized in a N-dimensional array, where N is the dimension of the images) of the segment are compared to candidate corresponding pixels about as many times as there are pixels in the second image frame.

Logically, this process can be described as follows. Suppose one of the pixels of the segment (or any other pixel with a fixed relationship to one or more of the pixels of the segment) is designated the segment reference pixel and one of the pixels of the image frame to which the segment is to be matched is designated the frame reference pixel. Then, each step of comparing is a process of overlaying the segment reference pixel on the frame reference pixel and then performing a calculation such as a sum of the differences of overlaying pixels. This step is then repeated for each possible frame reference pixel until the corresponding segment, or a best choice for the corresponding segment, is identified.

Where the calculation is the sum of the differences of overlaying pixels, the sum will be zero if an exact match occurs, i.e., if the segment is positioned over the image frame such that each pixel in the segment overlays a pixel in the image frame having the same pixel color value as the pixel in the segment. An acceptable match occurs when the sum of the absolute values of the differences (referred to herein as the $L^1$ norm) is less than or equal to some threshold. Lower $L^1$ norms indicate better matches.

The widely used video compression method of the Moving Picture Experts Group (MPEG) attempts to match segments comprising blocks of 16×16 pixels by placing each block at each possible location within an image frame, or portion thereof, and subtracting the pixel values. Once again, a match occurs when the sum of the absolute values of the differences between the pixel values is close to or equal to zero.

In other embodiments of the state of the art, the matching routines are not limited to the $L^1$ norm. Any form of minimizing norm is sufficient. This is mathematically known as the $L^P$ norm where $P \geq 1$.

The exhaustive search method is described below with reference to FIGS. 1A and 1B. In those figures, different colors are represented by different cross-hatching. Referring to FIG. 1A, a segment 10 has been identified and is to be matched against an image frame 11 (shown in FIG. 1B). FIG. 1B shows an image frame 11 containing six segments, labeled segment 12, segment 14, segment 16, segment 18, segment 20 and segment 22 (the background).

In the matching process, segment 10 is overlaid on image frame 11 at a given position and the color values of each pixel of segment 10 are subtracted from the values of corresponding pixels in image frame 11. In order to subtract pixel values, we assume a monochromatic image with linear color values; i.e., the difference between a pixel value of 30 and 31 is the same as the difference between a pixel value of 80 and 81. The monochromatic image is a function of the various color components of the original image. In another embodiment, motion matching routines are separately applied to each color component of the original image. Multiple possible matches can be generated in this manner. In this case, the intersection of the results is taken in order to determine the correct match. When the segment 10 is directly over a matching segment (segment 12, in this case) of image frame 11, then the sum of the absolute values of the differences will be zero or close to zero. The best match, as segment 10 is placed at each location within image frame 11, occurs when segment 10 is directly over segment 12 of image frame 11. Thus, the best match for segment 10 in FIG. 1B is segment 12.

Another known method of pattern matching is the traditional correlation method. The traditional correlation method entails overlaying the segment on the image frame, as described above and, at each pixel location, multiplying the segment pixel color value by the pixel color value of the corresponding image frame pixel. As the segment is overlaid in different locations, the goal of the method is to find the location that maximizes the sum of the products from each of the pixel locations.

For example, FIG. 2A shows a graph, with the horizontal axis representing displacement in an image frame and the vertical axis representing pixel value. The pixel value of a first image segment are greatest at the spikes of graph portion 21. FIG. 2B is a graph showing a low graph portion 22 and two spikes (graph portion 23). The spikes of graph portion 23 represent a second image segment that matches the first image segment. If graph portion 21 is placed over graph portion 22, as seen in FIG. 2C, and the corresponding pixel values multiplied, the sum of the products will be fairly small. Similarly, still referring to FIG. 2C, if graph portion 21 is placed almost on top of graph portion 23, but slightly offset, the sum will be greater. However, the largest sum occurs when graph portion 21 is placed directly over graph portion 23. Therefore, the second image segment is considered to be the best match.

The traditional correlation method is a variation of the exhaustive search method described above (the $L^1$ norm method being another variation). The traditional correlation method can be made faster than the $L^1$ norm method by taking advantage of certain mathematical properties of correlation. Correlation of signals is a well-known process of shifting one signal over another and multiplying the signals.

Consider two signals defined as functions of an independent variable t. The correlation of the two signals can be determined using Fourier transforms. Specifically, if p(t) and q(t) are the two signals the correlation $C_{p,q}(v)$ of p( ) and q( ) is:

$$C_{p,q}(v)=F^{-1}[P(s)Q^*(s)]$$

where $F^{-1}$ is the inverse Fourier transform, P(s) is the Fourier transform of p(t) and Q*(s) is the complex conjugate of the Fourier transform of q(t−v). Where the signals have more than one dimension, t, s and v can be expressed as vectors t, s and v of the appropriate dimension (vectors are denoted herein as bolded variables).

Relating this to the traditional correlation method introduced above, the segment being matched can be represented by the function f( ) such that the pixel located at a location represented by a vector r will have a pixel color value of f(r) and the image frame with which the segment is being matched can be represented by the function g( ) such that the pixel located at a location in that image frame represented by a vector r will have a pixel color value of g(r). For simplicity, assume that the segment is part of a first image frame and the image frame with which the segment is being matched is a second image frame and the first and second image frames are represented by N-dimensional arrays of pixel values having the same array sizes. To avoid interference in the correlation process from pixels in the first image frame that are not part of the segment, those pixels might have their pixel color values adjusted to zero, so that they do not contribute to any sum of multiplied pixel values; i.e., f(r)=0 for all r that point to pixels outside the segment being matched.

Using the above notation and functions, the sum of the products when the first and second images are aligned and overlaid is shown in Equation 1.

$$j = \sum_r f(r)g(r) \qquad \text{(Equ. 1)}$$

Now consider j as a function of u, a vector representing an offset between the first and second images. In other words, when the first and second image frames are offset by u and the corresponding pixel color values multiplied and summed, the result is shown in Equation 2.

$$j(u) = \sum_r f(r)g(r-u) \qquad \text{(Equ. 2)}$$

Using the above equations, the process of matching a segment to an image frame can be transformed into a process for identifying the value of u that results in the desired value for j(u), a task that would take only one or a few calculations for each value of u once j( ) is determined. The function j( ) can be determined by noting that Equation 2 is in the form of a convolution. Thus, j(u) is the inverse Fourier transform of F(s)G*(s), where F(s) and G*(s) are the Fourier transformations of f(r) and g(r−u), respectively.

There are numerous other methods of matching segments from one frame with segments from another frame, but previous techniques have either been computationally expensive or useful only for image frames with very specific characteristics. Therefore, what is needed is an improved method for matching a segment within an image frame in the general case without extensive computation.

SUMMARY OF THE INVENTION

The present invention provides for an efficient method of matching a segment in one image with a segment in another image. Fourier transforms are implemented to aid in the process.

A method of identifying a displacement of a segment present in a first image and a second image, according to one embodiment of the invention, the displacement representing a relative change in position of the segment between the first and second images, the method comprising: deriving a first image frame by copying the first image and setting all pixel values to zero for pixels that do not fall within the segment; deriving an inverse image frame, wherein a pixel value in the inverse image frame is an inverse of a corresponding pixel value in the second image, with corresponding pixel values being for pixels located in corresponding positions; and determining the value of u that yields a minimum for the absolute value of the quantity j(u)–A, wherein $$j(u) = \sum_r f(r-u)h(r) = A,$$

r is a variable that ranges over the second image, f is a function that returns a pixel value at the pixel location of the first image frame, the pixel location being specified by the function argument, h is a function that represents the inverse image frame and returns a value that is the inverse of the value that a function g returns, g is a function that returns a pixel value at the pixel location of the second image specified by the function argument, u is a motion vector representing the correct displacement of the segment within g for a match, and A equals the area of the segment represented as a number of pixels.

A method of identifying a displacement of a segment present in a first image and a second image, according to another embodiment of the invention, the displacement representing a relative change in position of the segment between the first and second images, the method comprising: deriving a first image frame by copying the first image and setting all pixel values equal to zero for pixels that do not fall within the segment; deriving an inverse image frame, wherein a pixel value in the inverse image frame is an inverse of a corresponding pixel value in first image frame, with corresponding pixel values being for pixels located in corresponding positions; and determining the value of u that yields a minimum for the absolute value of the quantity j(u)–A, wherein $$j(u) = \sum_r h(r)g(r-u) = A,$$

r is a variable that ranges over the first image, h is a function that represents the inverse image frame and returns a value that is the inverse of the value that a function f returns, f is a function that returns a pixel value at a pixel location of the first image frame, u is a motion vector representing the correct displacement of the segment within g for a match, and A equals the area of the segment represented as a number of pixels.

A further understanding of the nature and advantages of the inventions herein may be realized by reference to the remaining portions of the specification and the attached drawings.

DESCRIPTION OF THE SPECIFIC EMBODIMENTS

Figure 1A:
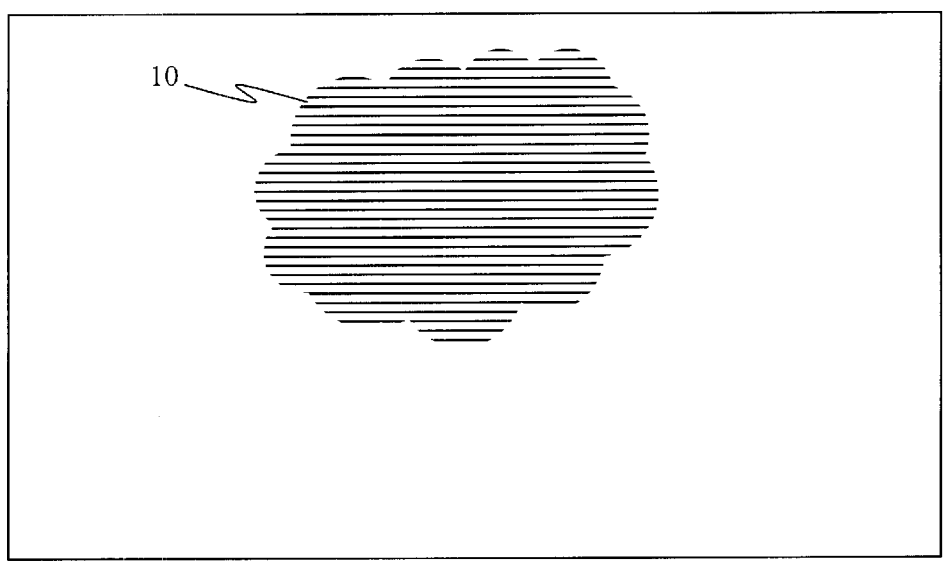
FIG. 1A is an image frame that illustrates an exhaustive search method of the prior art.
Figure 1B:
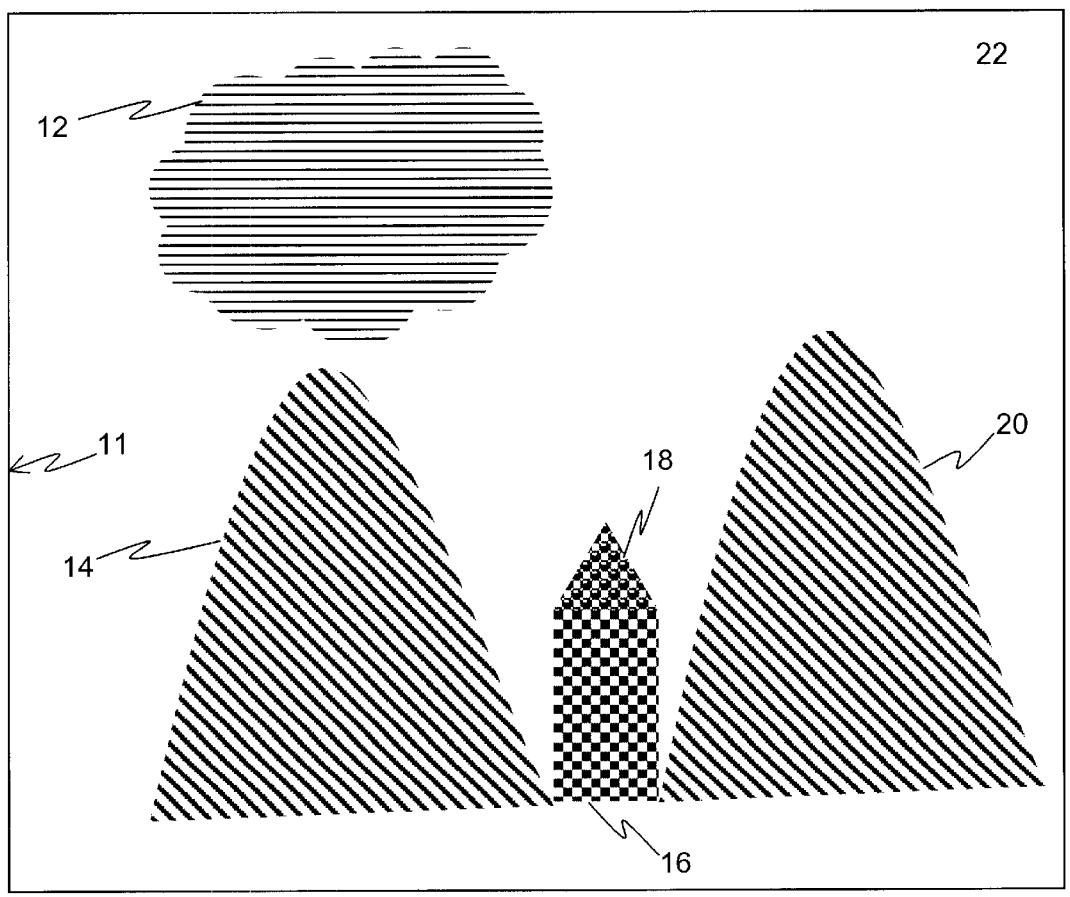
FIG. 1B depicts six segments and illustrates an exhaustive search method of the prior art.
Figure 2A:
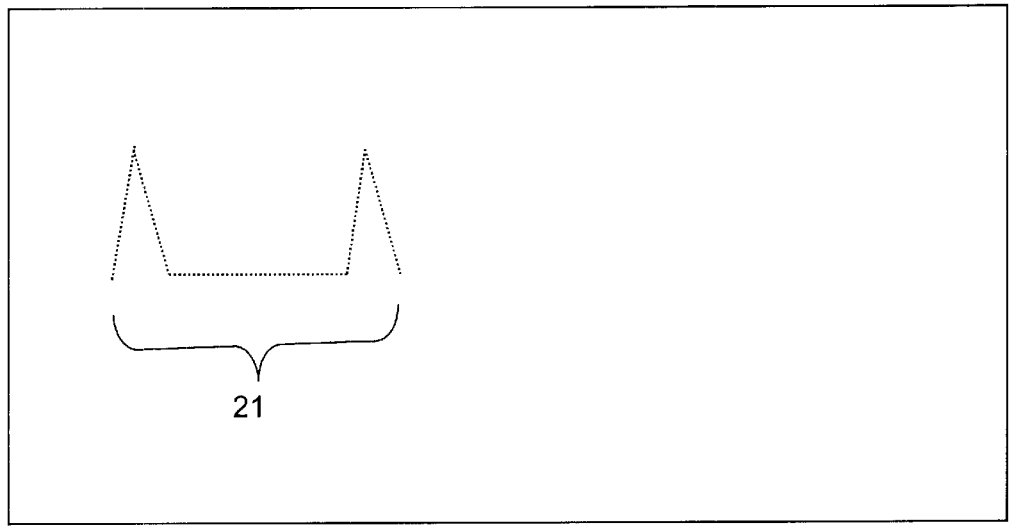
FIG. 2A depicts a graph of pixel values of a portion of an image frame.
Figure 2B:
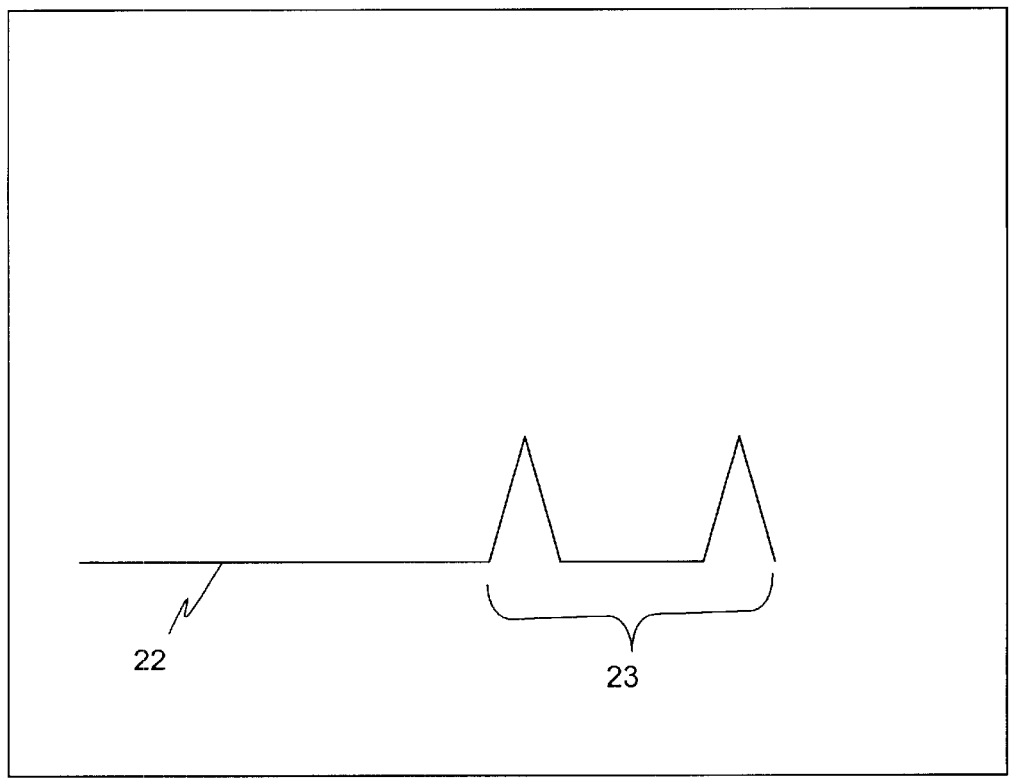
FIG. 2B depicts a graph of pixel values of a portion of an image frame.
Figure 2C:
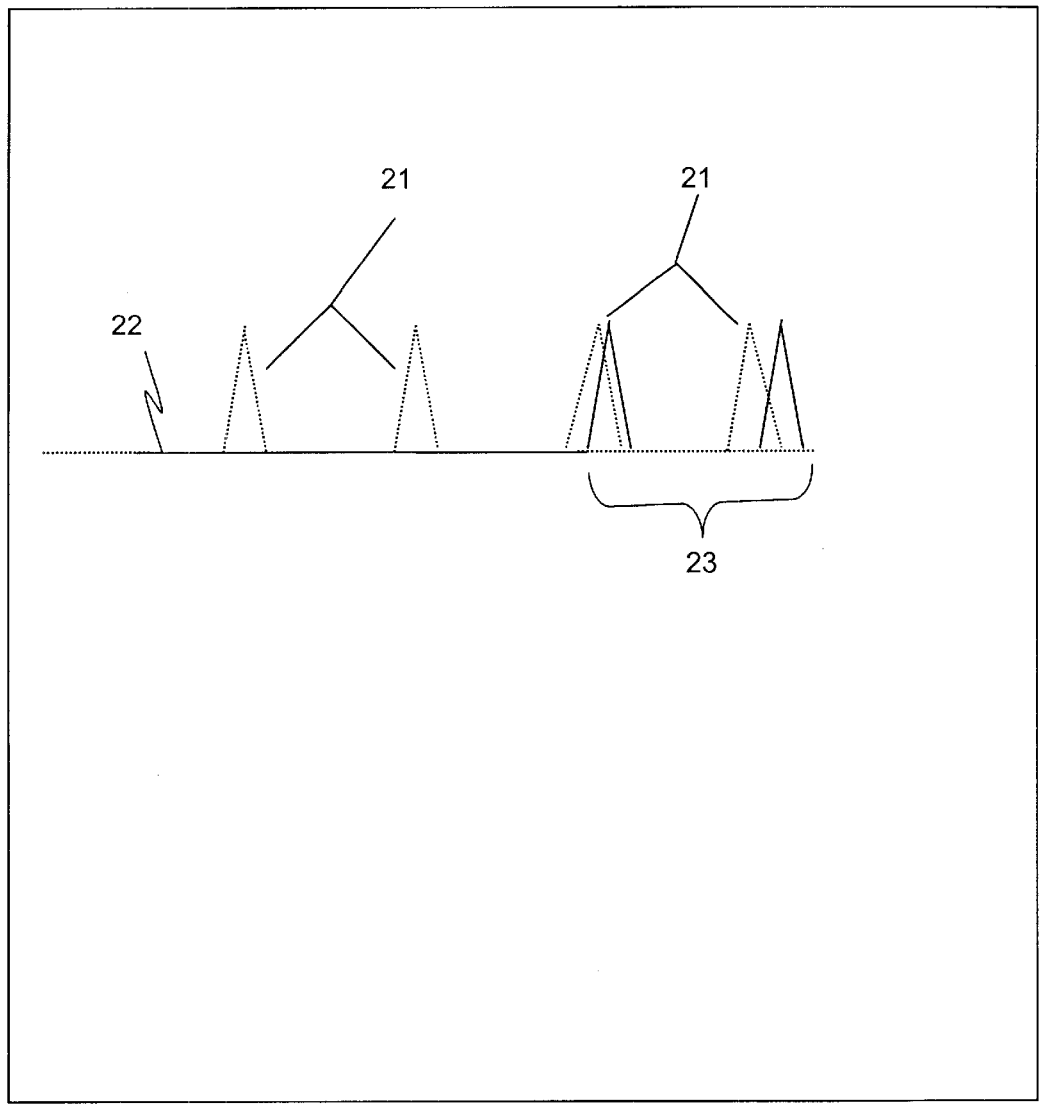
FIG. 2C depicts the graphs of FIG. 2A and FIG. 2B overlaying each other.

The preferred embodiments for carrying out the invention are now described, wherein like reference numerals indicate like or corresponding elements among the figures.

There are various drawbacks to the methods of the prior art, as mentioned previously. The major drawback inherent in an exhaustive search method is that it is computationally expensive. For example, to compare a two dimensional segment with each possible segment of similar size in a two-dimensional image frame requires on the order of N calculations where N is the number of pixels in the image frame.

The traditional correlation method is more limited than the exhaustive search method. While the exhaustive search methods can be used on any type of image frame, the traditional correlation method is limited to image frames having regions that are comprised primarily of high contrast areas.

In accordance with one embodiment of the present invention, instead of moving around the segment and comparing pixel values at each location, it is determined through fewer calculations, based upon the image frame characteristics, the location within the image frame which produces the best match or matches. The methods are explained in further detail below.

The utility of these methods is that they require far fewer calculations by the matching routine. That translates into significantly faster pattern matching which causes an overall increase in speed and efficiency in the various digital signal processing applications, which rely in part on pattern matching routines.

Some prior art matching routines that look for large products can produce multiple false matches due to the fact that there can be many combinations of numbers that when multiplied together produce a given product. Embodiments according to the present invention circumvent this problem by multiplying numbers by their inverse, as will be shown below, thus eliminating many false matches.

FIGS. 3–10 illustrate a method that embodies features of the present invention. The goal is to provide a faster means of locating the segment in an image frame. An attempt is made to match a given segment against a given image frame. In the case of an application in video compression, the given segment is often some pre-determined region in some image frame in the video sequence. If the segment is giving in the context of an image frame, the segment may be isolated from the remaining pixels in the image frame by setting the other pixels to zero, or equivalently by creating a blank frame equal in size to the image frame and copying the segment onto the blank frame. The resulting image frame, or segment frame, has a pixel value of zero everywhere except where the segment was inserted.

Figure 3:
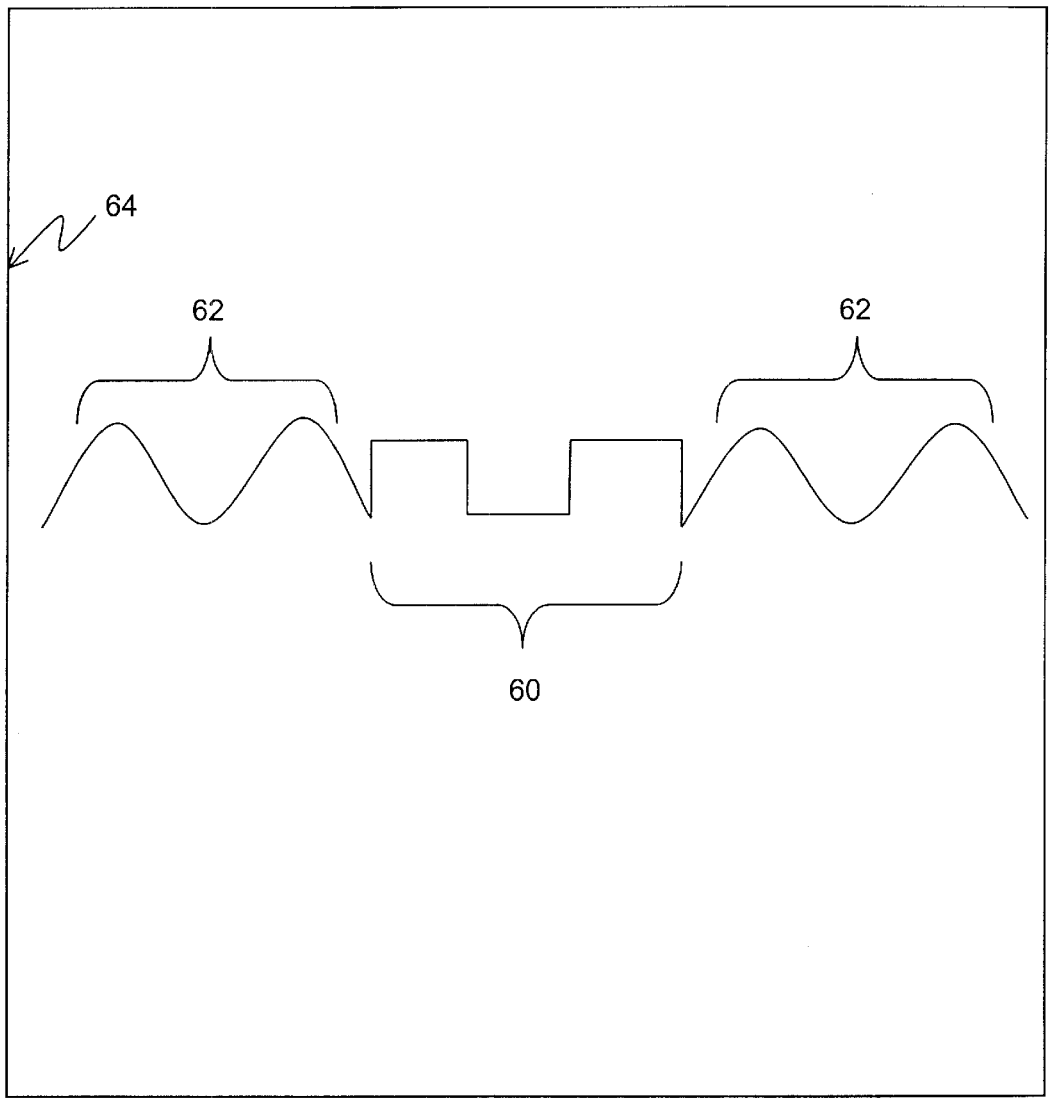
FIG. 3 illustrates an image frame containing a square wave sandwiched between two sinusoidal waves.
Figure 4:
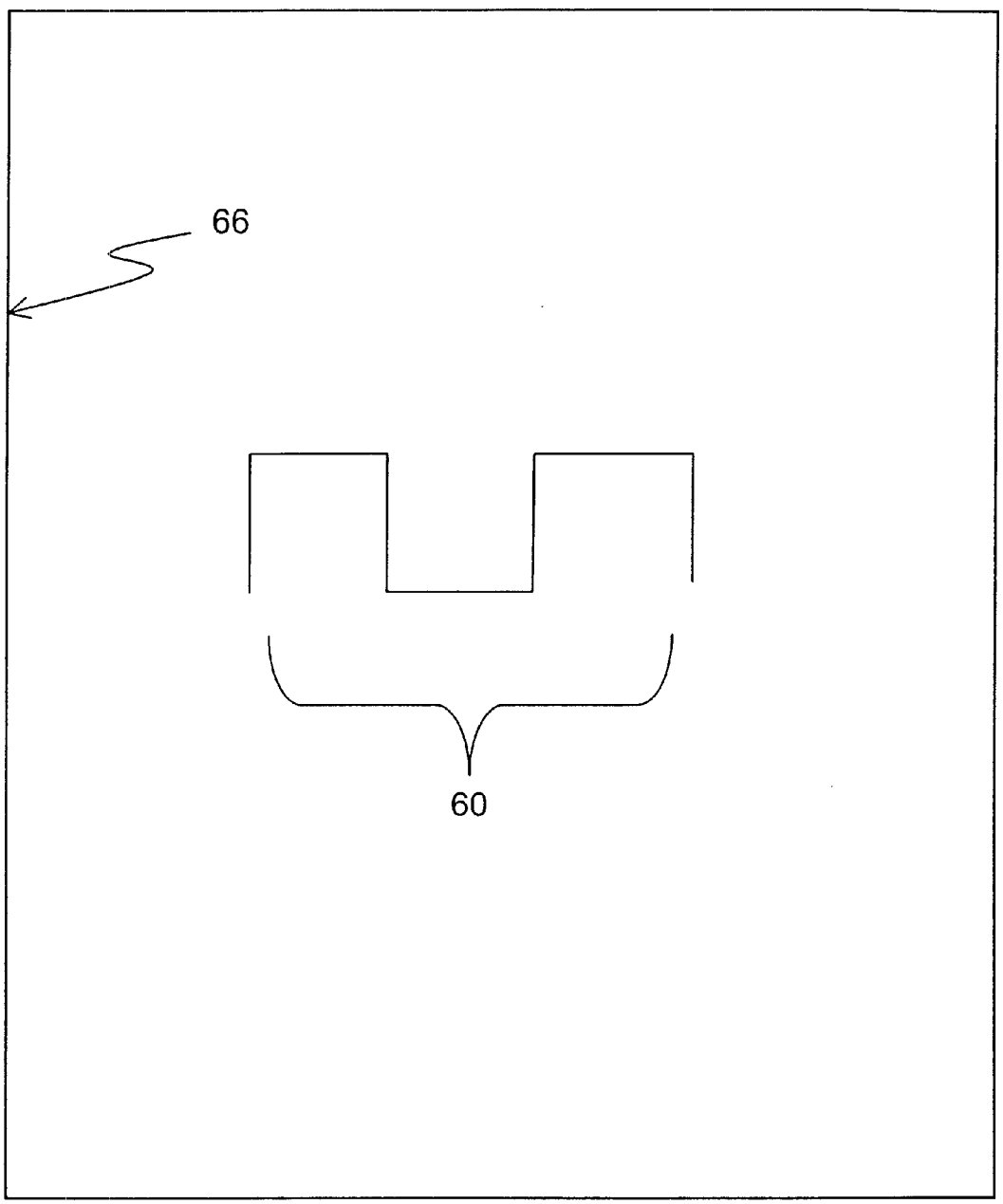
FIG. 4 shows the square wave of FIG. 3 copied into another image frame.

Referring to FIG. 3, a one-dimensional signal includes a square wave 60 sandwiched between two sinusoidal waves 62 in an image frame 64. The region 60, the square wave, represents the portion of the signal to be matched in a subsequent frame. FIG. 4 illustrates the result of copying the region 60 into an image frame 66 comprised solely of zero values.

Figure 5A:
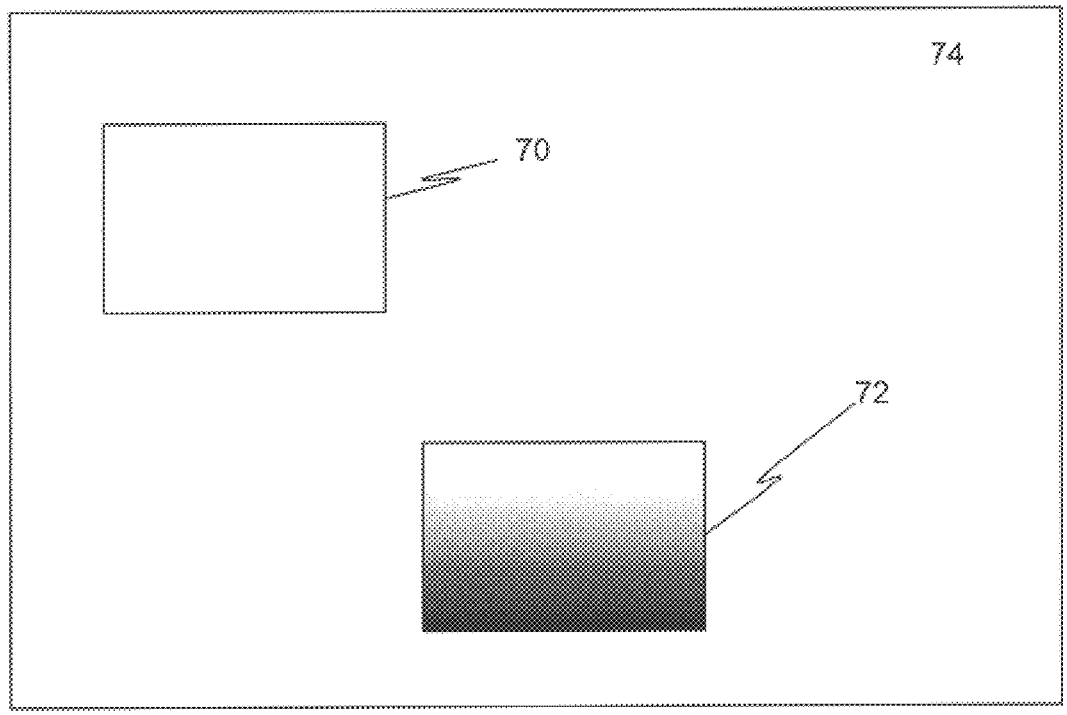
FIG. 5A shows an image frame.
Figure 5B:
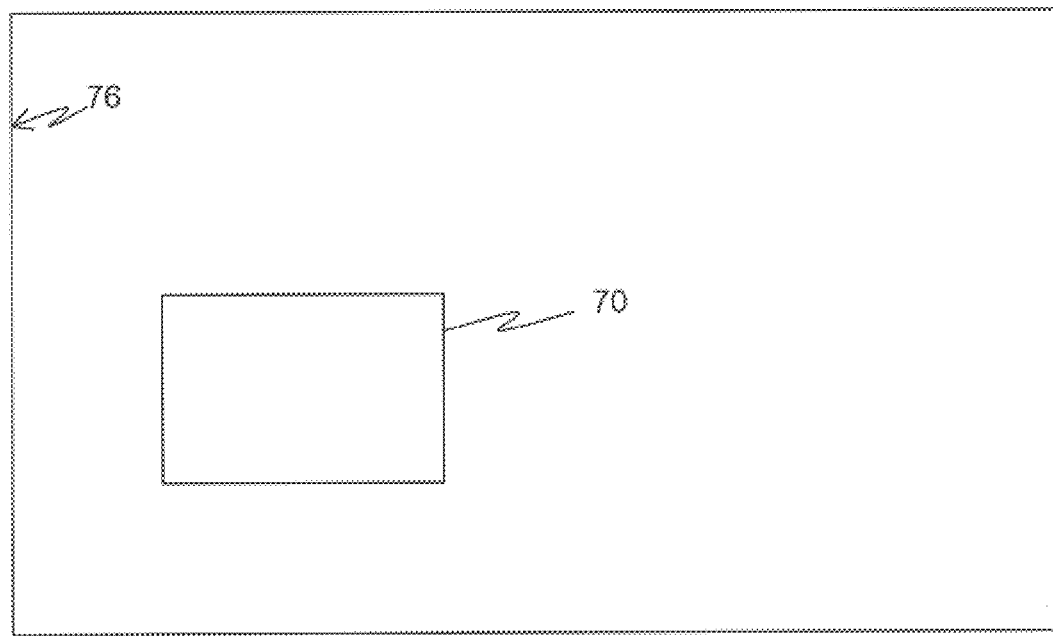
FIG. 5B depicts a segment of FIG. 5A copied into another image frame.

Turning now to FIGS. 5A and 5B, the given region 70 is the region to be matched. The segment 70 is a square of constant brightness. The segment 70 was obtained from FIG. 5A which includes two rectangles: the segment 70 of constant, strong brightness and the rectangle 72 of variable brightness. FIG. 5A also includes a background, region 74. The segment 70 can be isolated by copying it into a frame otherwise comprised of zeroes, resulting in the image frame 76 of FIG. 5B. This frame 76, the segment frame, is mathematically represented as f(r), where f(r) represents the pixel value at each position r.

For purposes of this description, the image frame to be matched within is mathematically represented as g(r). Taking the multiplicative inverse of the pixel values in g(r) derives an image frame. This derived image frame is mathematically represented as h(r). This derived image frame h(r) is multiplied by the frame containing the isolated segment, or segment frame f(r), which is conceptually placed at all possible location within h(r). A perfect match occurs when the multiplication yields a collection of ones, which summed together equals the area of the segment (i.e., the number of pixels within the segment). When a perfect match does not occur, a near perfect match yields a collection of numbers close to one, which when summed together will nearly equal the area of the segment. Another way of obtaining the same result is to find a minimum of the absolute value of {j(u)–A} for some u. j(u) may be obtained as described above, by taking the inverse Fourier transform of the product of the Fourier transform of f(r–u) and the Fourier transform of h(r).

In this convention, the lowest possible value of g(r) is 0. However, when taking the multiplicative inverse of g(r) in order to derive h(r), the invention will impermissibly attempt to divide by zero at each point where g(r)=0. Thus, in one embodiment, a small, positive offset ϵ is added to each pixel value in both the segment frame f(r) and the image frame g(r) to prevent the possibility of division by zero. Thus, f(r) remains zero at all points outside of the segment, but within segment 70 f(r) equals the original pixel value plus ϵ at each location. Similarly, g(r) equals the pixel value at each pixel location in the image frame where a match for the region in f(r) is to be found, plus ϵ. Thus h(r), the multiplicative inverse of g(r), may be derived without the possibility of dividing by zero. In an alternate embodiment, the inverse is only taken at pixels where there are non-zero values to take the inverse of.

Figure 5C:
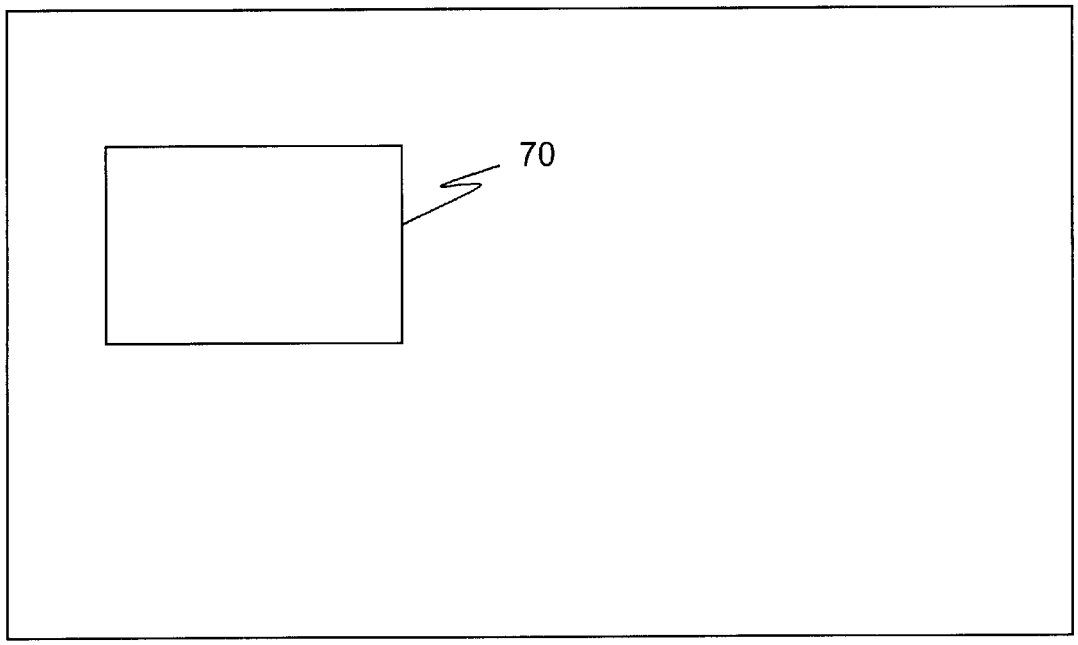
FIG. 5C depicts a scenario where a segment occupies the same location in an isolated image frame and a derived image frame.
Figure 5D:
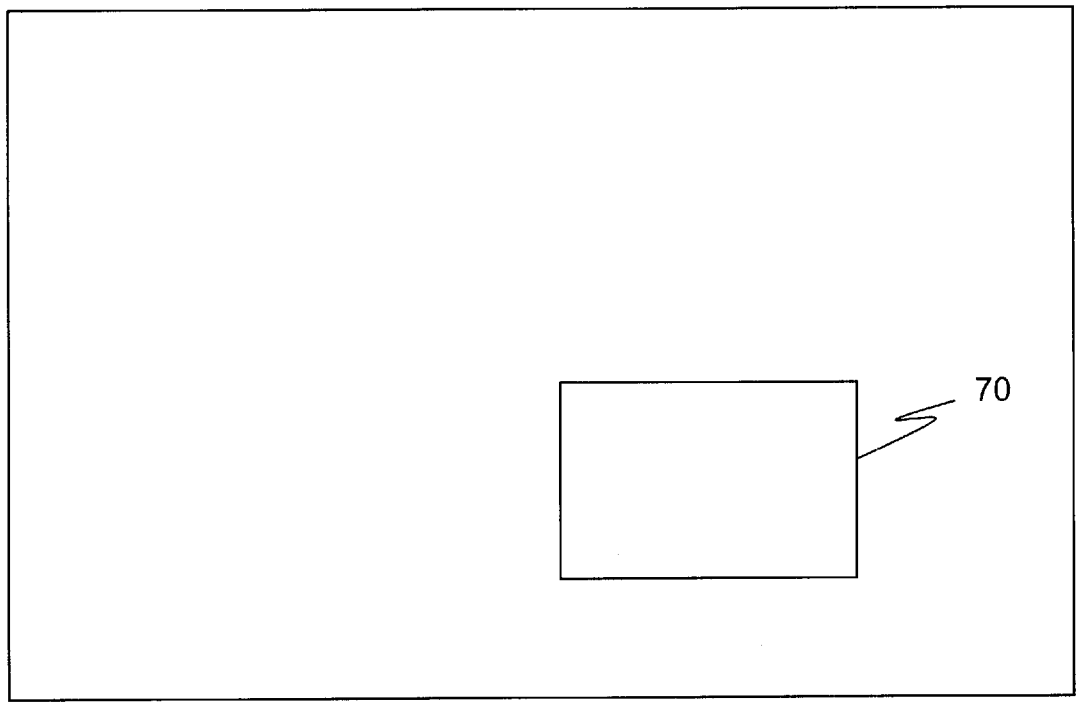
FIG. 5D depicts a scenario where the segment has changed location.
Figure 5E:
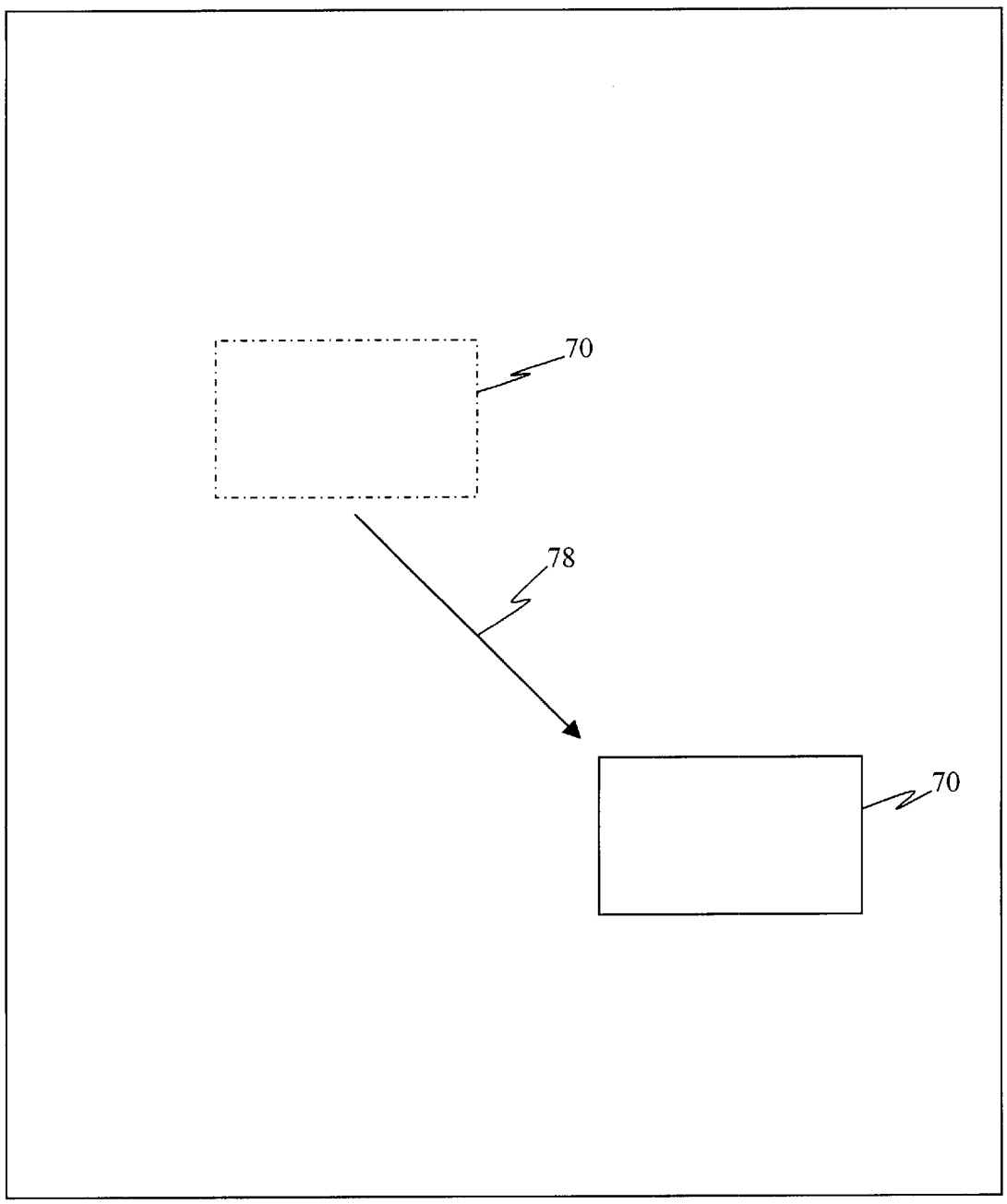
FIG. 5E shows the segment of FIG. 5B being displaced by the vector u.

At each location, the pixel values are multiplied together and the products summed together. Once again, a perfect match occurs when the sum of the products yield a collection of ones, or values near one, which when summed together equal, or nearly equal, the area of the segment 70. In FIG. 5C, segment 70 occupies the same location in both the isolated frame 76 and the derived frame, such that no motion of the derived image frame was necessary. The mathematical representation of the perfect match becomes $$j = \sum_r f(r)h(r),$$

where j equals the area A of the region being matched when there is a perfect match. However, in FIG. 5D the segment 70 has changed location. Referring to FIG. 5E, the change in location is represented by the motion displacement vector u 78. The vector u 78 has the effect of displacing a segment. Thus, f(r) describes the segment 70 and f(r–u) describes the segment 70 displaced by u within the segment frame. Thus, the formulation becomes $$j(u) = \sum_r f(r-u)h(r),$$

where j(u) represents the sum of the products at each offset u. Further, j(u)=A when u equals the correct or ideal motion vector, i.e., the change in the location of region 70.

Figure 6:
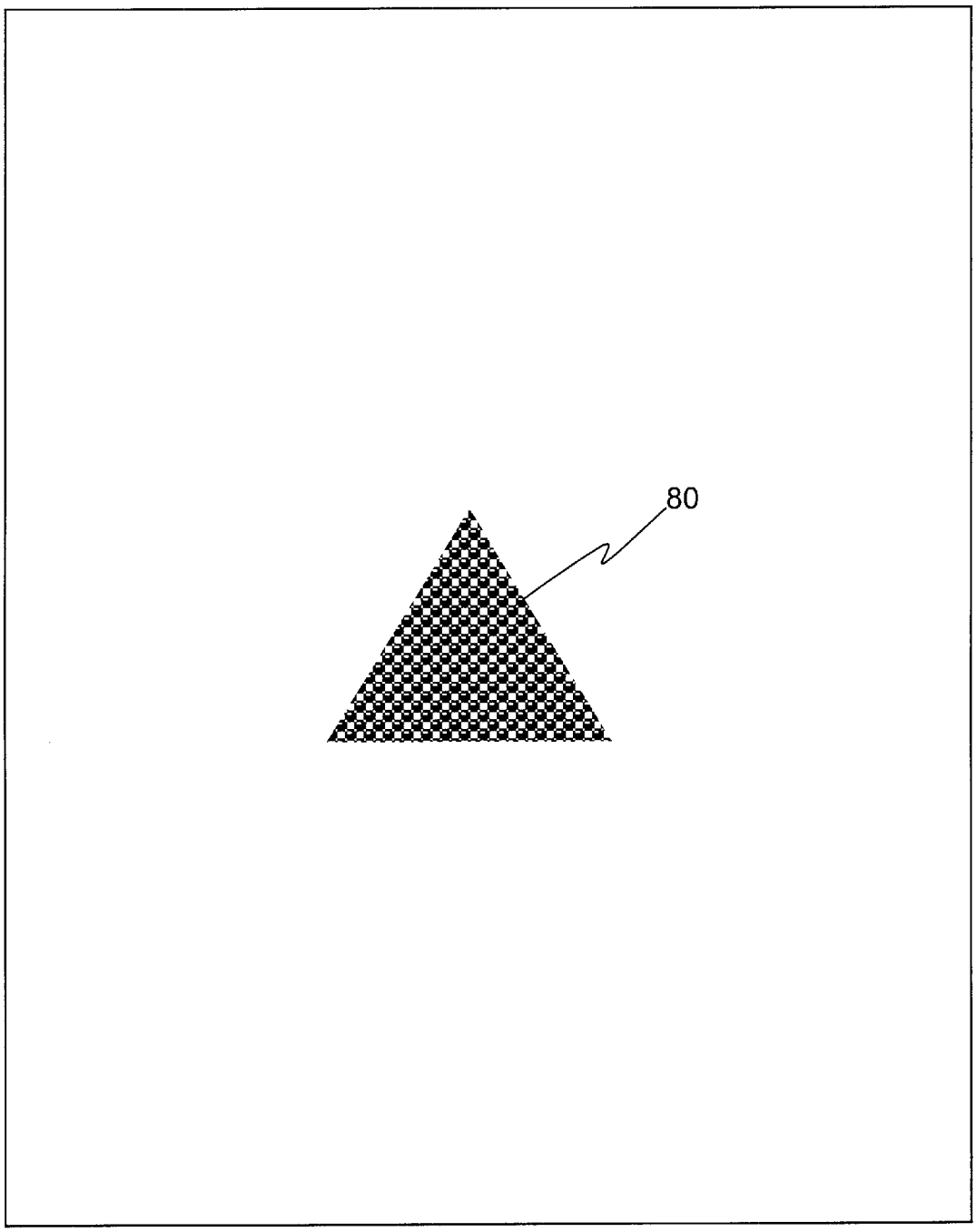
FIG. 6 is a segment in the shape of an attic.
Figure 7:
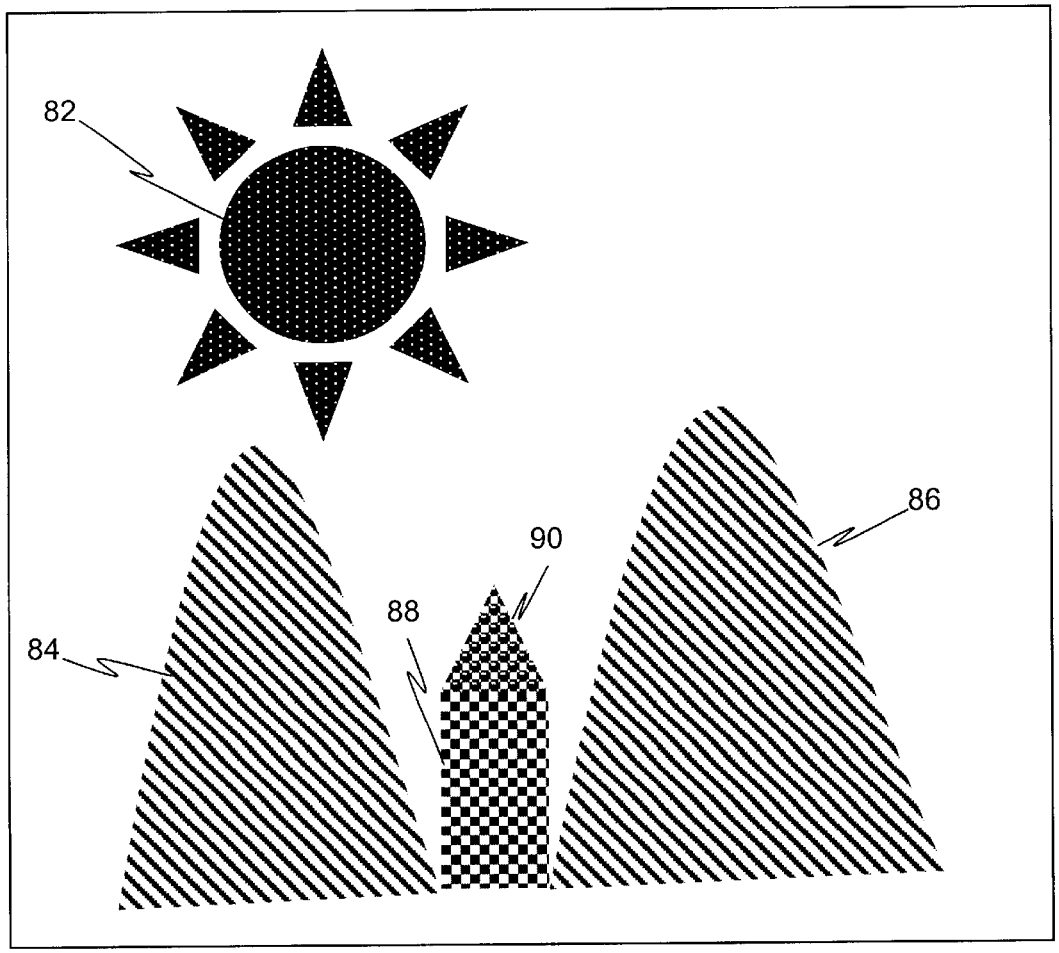
FIG. 7 shows various segments, one of which is an attic.

FIG. 6 represents an attic 80 that has been placed in an image frame of otherwise zeroes. FIG. 7 is comprised of several segments: a sun 82 of high intensity values, mountains 84, 86 of low intensity, and a house 88 and an attic 90, each of average intensity. To determine which segment in FIG. 7 matches region 80, the segment 80 is conceptually placed at each value of u in FIG. 7. The objective is to determine which value of u yields A, the area of the segment 80, when the segment 80 is multiplied by the image frame derived from FIG. 7.

The region 80 is placed at each potential location within FIG. 7. Obviously, the best match occurs when the region 80 is placed on top of the region 90. Thus, the best match occurs when the region 80 is offset from its original position by u such that the region 80 is sufficient to cover the region 90.

Similarly, it is contemplated that the multiplicative inverse of the segment instead of the image frame can be calculated. In that case, f(r) and g(r) remain unchanged. However, h(r) equals zero at all points outside of the segment and the multiplicative inverse of f(r) at all points within the segment.

It is also envisioned that no inversion be used at all. Specifically, the segment is conceptually placed at each location in the image frame. At each location, pixels of the segment are multiplied by the corresponding pixels of the image frame and the products are summed. At the point of matching, the result will be equal to the sum of the squares of the pixel values. Mathematically the formulation becomes, $$j(u) = \sum_r g(u-r)f(r) = \sum f^2(r)$$

at the best match. This formula may be solved using the Correlation Theorem as described above.

In lieu of using f(r), g(r) and h(r), the invention may use image frames derived from applying various transformations. Preferably, the transformation should be monotonically increasing or decreasing. Some suitable examples include logarithmic and exponential functions.

The method of the present invention is superior the exhaustive search methods because, as explained above, the exhaustive search method requires $N^2$ calculations to match a segment. The present invention, on the other hand, only requires N log N calculations to match the same segment.

Figure 8:
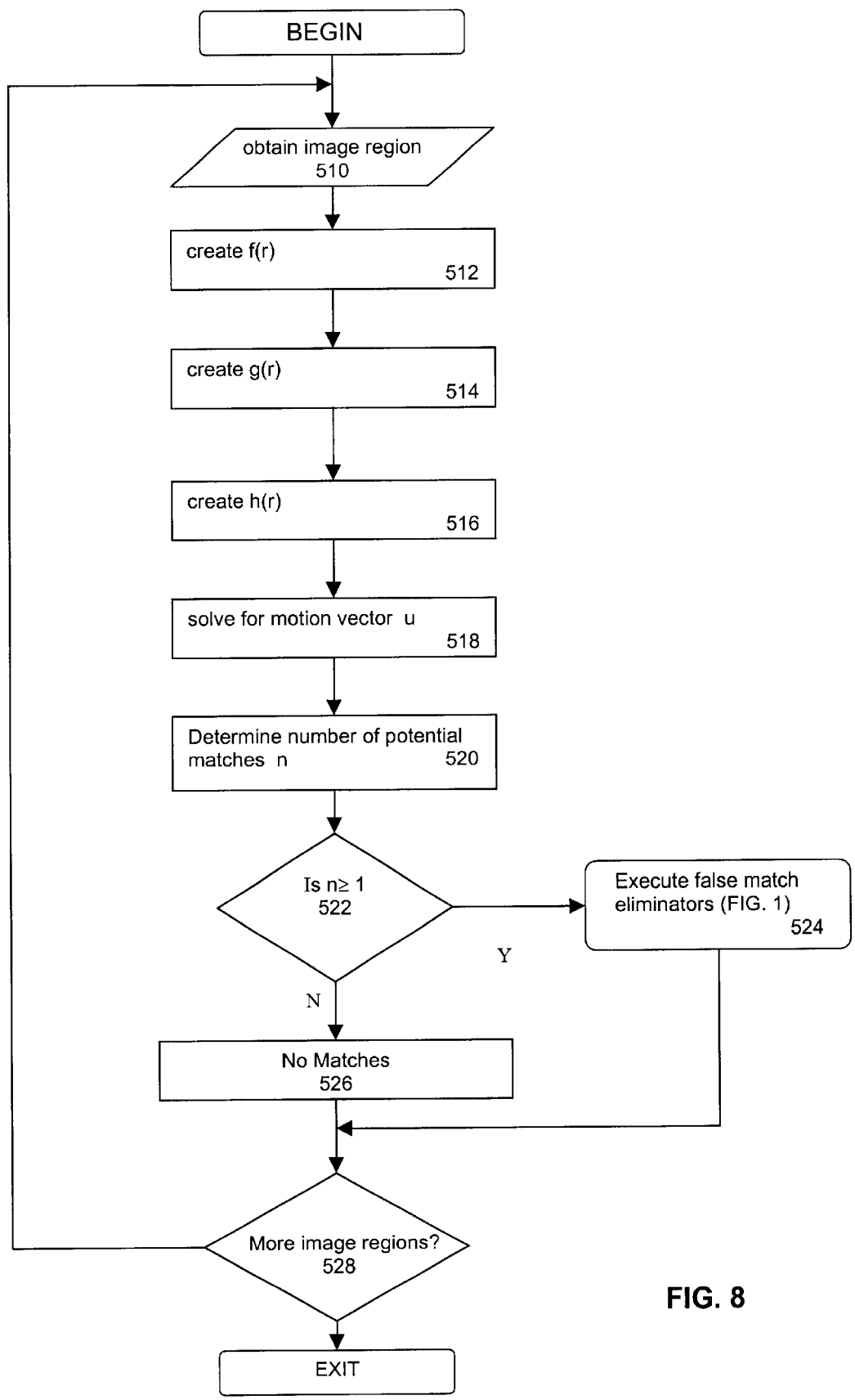
FIG. 8 is a flow chart illustrating a method of the present invention.

Referring now to FIG. 8, a method in accordance with one embodiment of the present invention is presented in the form of a flow chart. At step S10, a segment is obtained that is to be matched. At step S12, f(r) is created from the given segment plus a small offset. Similarly, at step S14, g(r) is created from the image frame plus a small offset. At step S16, the multiplicative inverse g(r) is calculated. Step S18 involves solving for the motion vector u using the method as described above. Step S20 involves determining how many potential matches there are for the reference segment. At step S22, a decision is made. If there is at least one potential match, the error correction routine at step S24 is executed. Otherwise, the routine continues. The error correction routine is described below. If there are no matches, at step S26 the routine returns a no match flag.

At step S28, the invention determines if there are any more frame segments to be matched. If so, the routine continues at step S10. Else, the routine ends.

In an alternate embodiment according to the present invention, at step S16, the inverse of the segment could be calculated, instead of the inverse of the image frame. Therefore, instead of solving j(u)=Σh(r)f(r−u), the invention could solve j(u)=Σh(r)g(r−u), where h(r) is the multiplicative inverse of the segment. The calculations are otherwise identical.

In another embodiment, the routine could skip step S16 altogether, and solve the equation $$j(u) = \sum_r f(r)g(r-u) = \sum_r f^2(r)$$

at step S18.

It is envisioned that a biasing process can be used as a part of the present invention. This biasing process can involve biasing the future motion of the segment to be matched as it is moved within the image frame it is being matched in. In other words, the algorithm can monitor the motion of the segment and determine if the segment is getting closer to a match or farther away from a match. The future direction of motion of the segment could be adjusted in accordance therewith.

It should be noted that the pattern matching routines do not always produce a single match. It is possible that the invention will initially designate multiple segments as good matches for the segment in question. Some matches may be valid while others may be false matches.

Figure 9A:
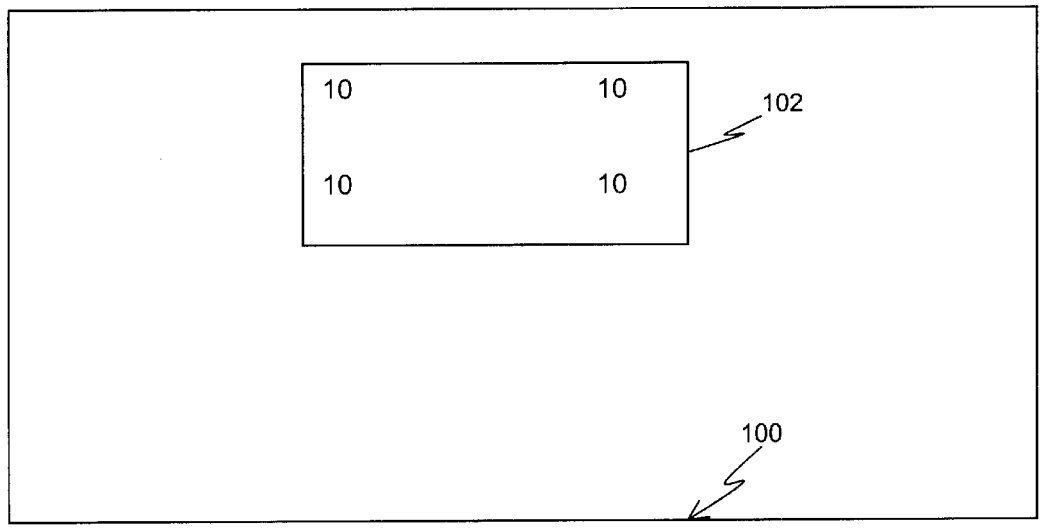
FIG. 9A is an image frame containing a segment to be matched.
Figure 9B:
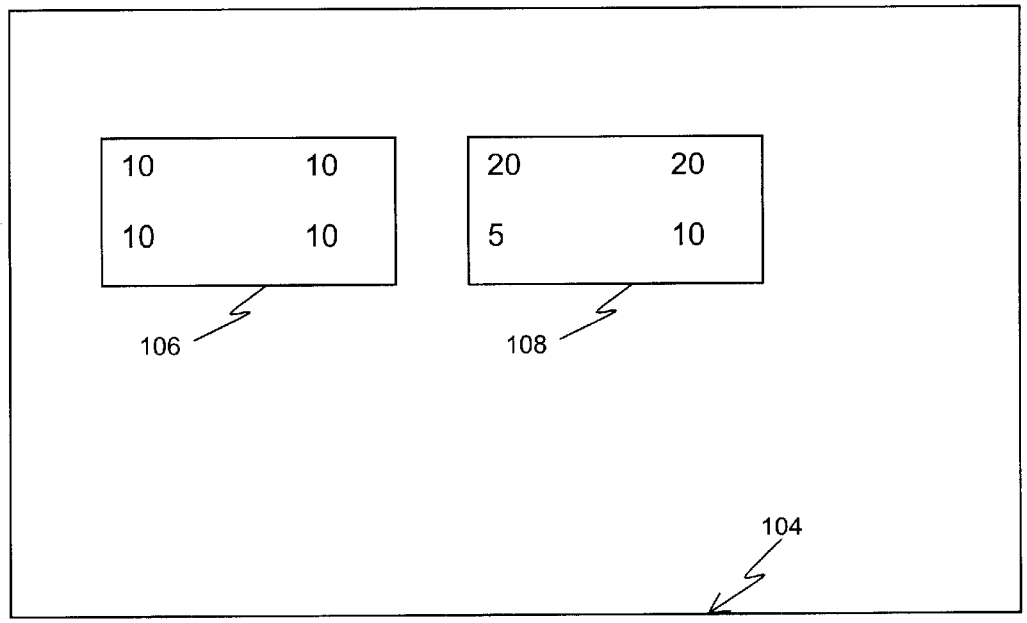
FIG. 9B is an image frame containing one match and one possible false match for the segment in FIG. 9A.

An example of a false match is seen in FIGS. 9A and 9B. In frame 100, segment 102 is obtained from frame 100 and is composed of four pixels each having a pixel value of 10. In frame 104, there are two segments. These segments are designated as segments 106 and 108, respectively. Segment 106 likewise has four pixels each having a value of 10. However, segment 108 has four pixels having values of 20, 20, 5 and 10, respectively. For example, in the inversion method described above, the matching routine will return both segment 106 and segment 108 as exact matches, even though segment 108 is not the same segment as segment 102.

An exhaustive search routine can then be run for the possible matches. Alternatively, any other suitable matching program can then be run at this point. The intersection of the matches can be chosen as the correct match.

One method of eliminating false matches involves a direct comparison of the segments. Typically, the number of potential matches are small compared to the number of potential locations. Therefore, the direct pixelwise comparison is computationally acceptable.

The direct comparison method described above is a common method of eliminating false matches. The invention places the segment at the location of each potential match candidate and computes the sum of the absolute value of the difference between the pixel values. As explained above, this is known as minimizing the $L^1$ norm. At a good match, $L^1$ is close to zero. Potential match candidates for which $L^1$ is not close to zero are discarded. In the example in FIGS. 9A and 9B, the direct comparison method would yield $L^1$=0+0+0+0=0 when comparing the segment 102 with the segment 106. However, the same comparison would yield $L^1$=10+10+5+0=25 when comparing the segment 102 with the segment 108. Thus segment 108 is not a good match.

Alternatively, multiple transformations may be employed, as described above, to eliminate false matches. Specifically, instead of only using f(r), g(r) and h(r) to determine which segments are good matches, the invention also uses f'(r), g'(r) and h'(r), which are their respective counterparts using a different transformation. Segments that are true matches should still be designated. However, segments that were matched through happenstance will not be matched again.

Preferably, the transformation will be monotonically increasing or decreasing and not periodic, in order to avoid degenericies. This secondary matching routine will produce a set of potential matches some of which are true matches and some of which are false matches. The candidates that are common to both routines are kept and the others are discarded as false matches. The candidates that are common to both are most likely true matches since they were matched under both systems if the transforms are independent. Matches that were designated by only one method are generally false matches.

In the instant example, the matching routine described above that inverts image frames is utilized in conjunction with a logarithmic transformation (i.e., f'(r)=log(f(r)); g'(r)=log(g(r)); h'(r)=log(h(r)). Comparing the segment 102 with the segment 108 yields the value 4.3. However, comparing the segment 102 with the segment 106 still yields 4. Thus, by yielding the value 4.3 instead of the value 4, the invention has eliminated the segment 108 as a possible match for the reference frame. After discarding the false matches, the routine simply chooses the segment with the best correlation to the reference segment and designates it as the match.

Figure 10:
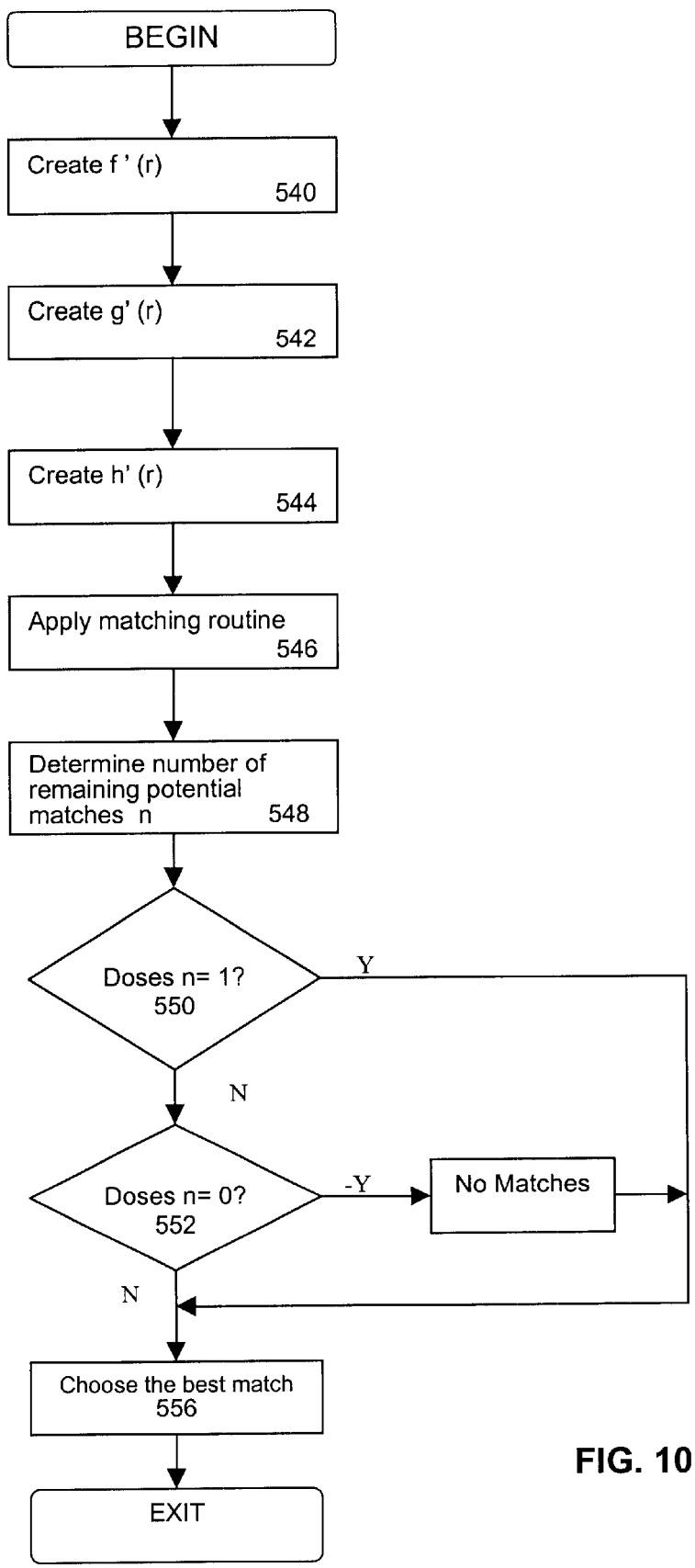
FIG. 10 is a flow chart illustrating a method of eliminating a false match.

Referring now to FIG. 10, at step S40, a non-linear version of f(r) is created. Similarly, at step S42, a non-linear version of g(r) is created. At step S44, a non-linear version of h(r) is created. At step S46, the matching routines are applied to determine which segments are matched and discards the matches that are not designated under both the linear and non-linear matching routines.

In keeping with the invention, step S48 determines the number of remaining potential matches n. At step S50, if only one match remains, the routine assumes that it is a correct match and exits. Otherwise, at step S52, if no matches remain, the routine exits. If there are still multiple matches, at step S56 the invention chooses the best match as the correct match. The routine then exits.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of identifying a displacement of a segment present in a first image and a second image, the displacement representing a relative change in position of the segment between the first and second images, the method comprising:

deriving a first image frame by copying the first image and setting all pixel values to zero for pixels that do not fall within the segment;

deriving an inverse image frame, wherein a pixel value in the inverse image frame is an inverse of a corresponding pixel value in the second image, with corresponding pixel values being for pixels located in corresponding positions; and determining the value of u that yields a minimum for the absolute value of the quantity j(u)−A, wherein $$j(u) = \sum_r f(r-u)h(r) = A,$$

r is a variable that ranges over the second image, f is a function that returns a pixel value at the pixel location of the first image frame, the pixel location being specified by the function argument, h is a function that represents the inverse image frame and returns a value that is the inverse of the value that a function g returns, g is a function that returns a pixel value at the pixel location of the second image specified by the function argument, u is a motion vector representing the correct displacement of the segment within g for a match, and A equals the area of the segment represented as a number of pixels.

2. The method of claim 1, wherein u returns a value that is the inverse of the value that the function g returns for all non-zero values of g, and h otherwise returns the value zero.

3. The method of claim 1, wherein h is a function that returns a value that is the multiplicative inverse of the value that g returns.

4. The method of claim 1, wherein j(u) is calculated by taking the inverse Fourier transform of the product of the Fourier transform of f(r−u) and the Fourier transform of h(r).

5. The method of claim 1, the method further comprising executing a routine that eliminates false matches.

6. The method of claim 5, wherein eliminating false matches includes creating transformations of f(r), g(r) and h(r), and applying a matching routine with the respective transformations to ensure there is still a match.

7. The method of claim 1, the method further comprising adding a small positive offset to each pixel value in f(r) and g(r).

8. A method of identifying a displacement of a segment present in a first image and a second image, the displacement representing a relative change in position of the segment between the first and second images, the method comprising:

deriving a first image frame by copying the first image and setting all pixel values equal to zero for pixels that do not fall within the segment;

deriving an inverse image frame, wherein a pixel value in the inverse image frame is an inverse of a corresponding pixel value in first image frame, with corresponding pixel values being for pixels located in corresponding positions; and determining the value of u that yields a minimum for the absolute value of the quantity j(u)−A, wherein $$j(u) = \sum_r h(r)g(r-u) = A,$$

r is a variable that ranges over the first image, h is a function that represents the inverse image frame and returns a value that is the inverse of the value that a function f returns, f is a function that returns a pixel value at a pixel location of the first image frame, u is a motion vector representing the correct displacement of the segment within g for a match, and A equals the area of the segment represented as a number of pixels.

9. The method of claim 8, wherein u returns a value that is the inverse of the value that the function f returns for all non-zero values of f, and h otherwise returns the value zero.

10. The method of claim 8, wherein h is a function that returns a value that is the multiplicative inverse of the value that f returns.

11. The method of claim 8, wherein j(u) is calculated by taking the inverse Fourier transform of the product of the Fourier transform of h(r) and the Fourier transform of g(r−u).

12. The method of claim 8, the method further comprising executing a routine that eliminates false matches.

13. The method of claim 12, wherein eliminating false matches includes creating transformations of f(r), g(r) and h(r), and applying a matching routine with the respective transformations to ensure there is still a match.

14. The method of claim 8, the method further comprising adding a small positive offset to each pixel value in f(r) and g(r).

* * * * *